Nov. 25, 1947.   P. ANDERSON   2,431,446
GREASE-SEALED UNDERWATER PULLEY BLOCK
Filed Feb. 5, 1945   2 Sheets-Sheet 1

INVENTOR.
Peter Anderson

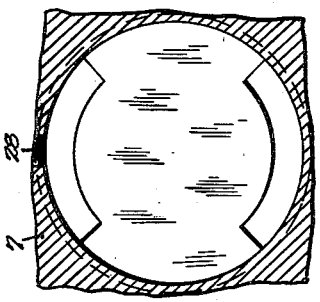
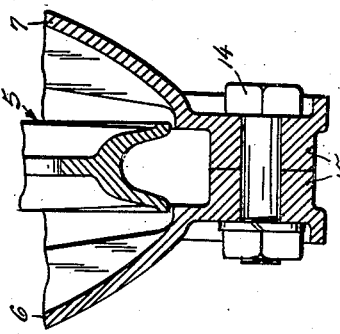
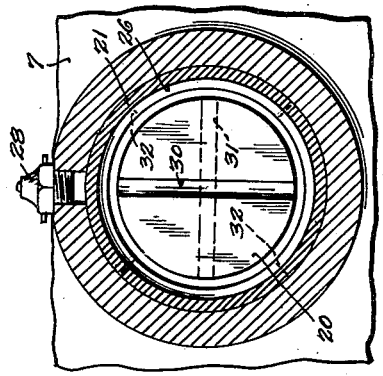
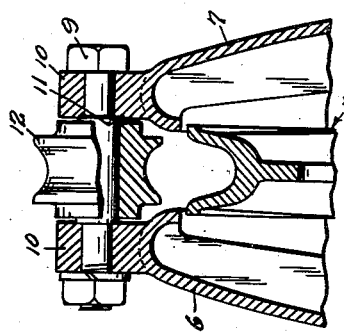
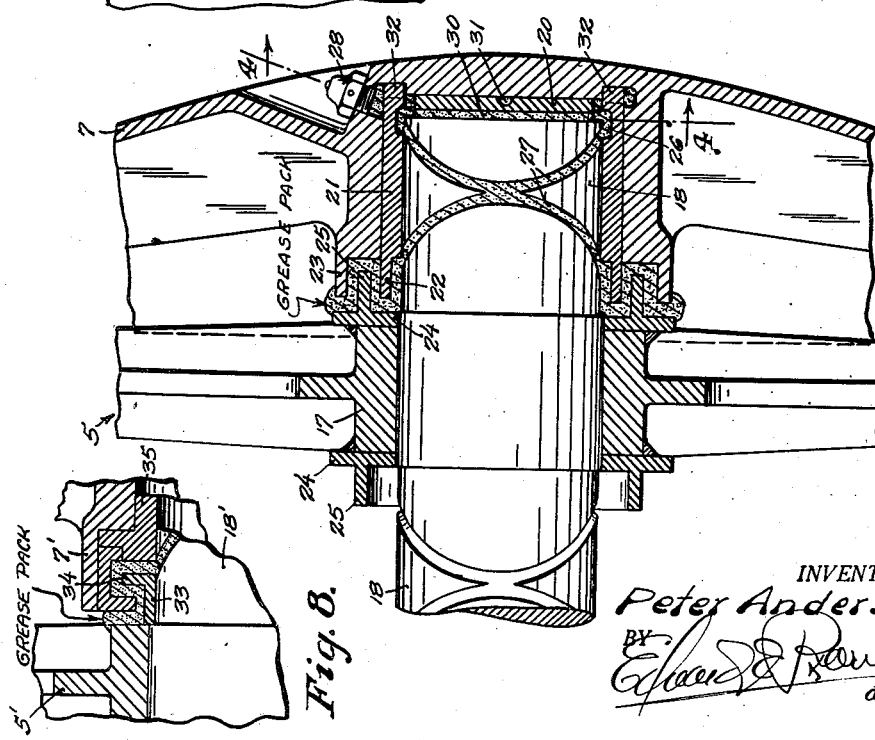

Patented Nov. 25, 1947

2,431,446

UNITED STATES PATENT OFFICE 2,431,446

GREASE-SEALED UNDERWATER PULLEY BLOCK

Peter Anderson, Seattle, Wash., assignor to Washington Iron Works, Seattle, Wash., a corporation of Washington Application February 5, 1945, Serial No. 576,244

4 Claims. (Cl. 254—192)

This invention relates to pulley blocks of the journal-bearing type and such, more especially, as admit to underwater usage, and its object is to provide a perfected greasing system for blocks of this nature which will substantially preclude access of water to the bearing surfaces of the journal. More particularly, the invention aims to introduce a labyrinth seal into the grease-line of the pulley-block, placing this seal such as will locate the same in an intervening position between the journal surfaces and the eject end of the greasing system.

The invention consists in the novel construction and in the adaptation and combination of parts hereinafter described and claimed.

In the accompanying drawings:

Fig. 3 is a fragmentary transverse vertical section taken to an enlarged scale on line 3—3 of Fig. 1 with stippling being employed to denote grease.

Fig. 4 is a detail sectional view on line 4—4 of Fig. 3.

Fig. 5 is a detail view taken on the same section line as Fig. 4 with the bushing and thrust-washer removed.

Figure 2:
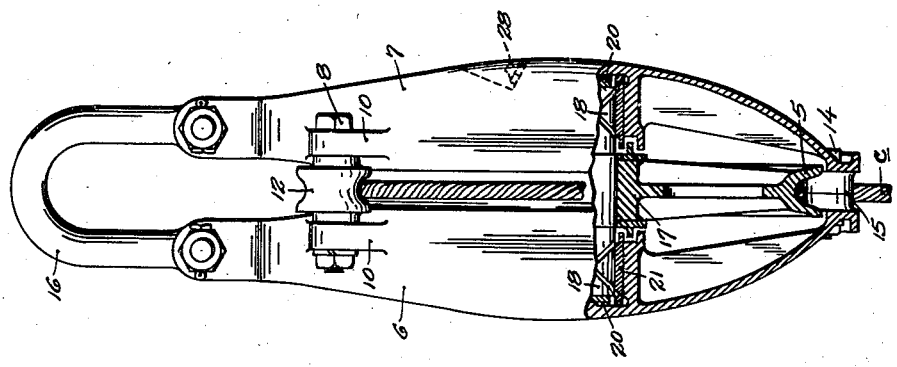
Fig. 2 is a view partly in elevation and partly in transverse vertical section taken on line 2—2 of Fig. 1.
Figure 1:
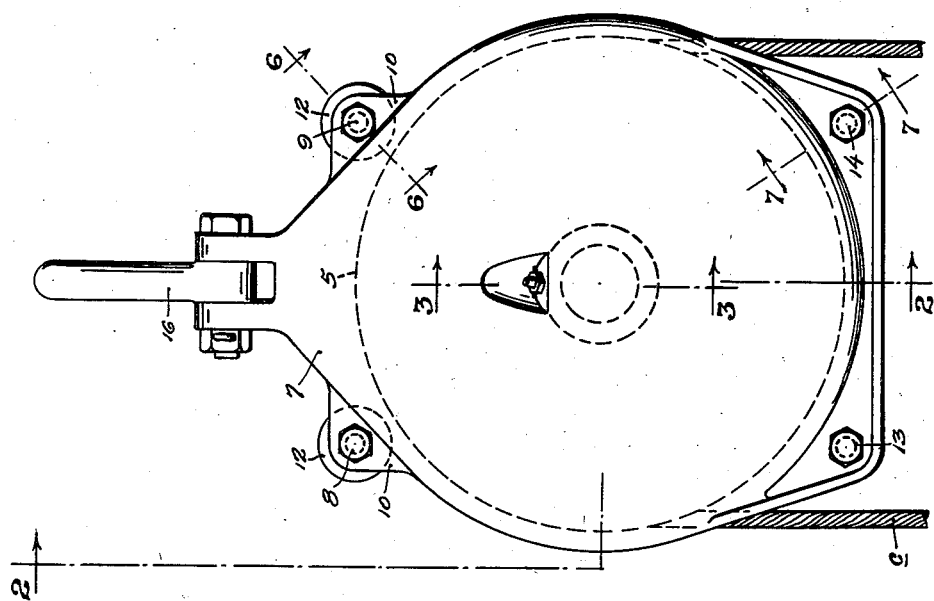
Figure 1 is a view in side elevation illustrating a pulley block embodying the present improvements, and introducing a fragmentary showing of a cable applied thereto.

Fig. 6 and Fig. 7 are each detail sectional views taken on lines 6—6 and 7—7, respectively, of Fig. 1, the scale being enlarged; and Fig. 8 is a view similar to Fig. 3 excepting that the same is largely confined to the labyrinth seal and showing a modified structural arrangement in which a tongue-plate—constituting a part of the labyrinth seal—which is caused to revolve in unison with the sheave is placed upon the sheave-carrying axle rather than, as portrayed in Fig. 3, being welded to the face of the sheave's hub.

Referring to said drawings, the sheave is indicated generally by the numeral 5 and, as is customary, is received between companion cheek-plates 6 and 7 which are of the solid type presenting more or less smooth facing surfaces and having the edges curved inwardly throughout the greater part of the perimeter to describe, by the opposing inner side walls, guide lips functional to the circumferential cable-receiving groove provided in the rim of the sheave. For their connection, the cheek-plates rely upon bolts which are applied, top and bottom, at opposite sides of the vertical center line. The upper said pair of bolts, denoted 8 and 9, are received through shoulder-lugs 10 of the cheek-plates and pass through spreader pipes 11 (Fig. 6) on which rollers 12 are mounted, the rollers serving a retaining office in respect of the applied cable c. Detailed in Fig. 7, the lower bolts 13 and 14 are received through the drilled holes of registering bosses 15 which are brought to bear, the boss of one against the boss of the other cheek-plate. Each cheek-plate is provided upon its upper end with the usual spaced ears to accommodate a clevis or the like 16.

Reverting to the sheave, the same is made fast by its hub 17 to a supporting shaft, and presented by this shaft to extend in opposite directions from the hub are stub axles 18 which find a journal mounting in boxed openings let in from the inner faces of the two cheek-plates. Each stub axle bears by its end upon a thrust-washer 20 and receives its journal from a bushing 21.

Describing the greasing system, and having reference to the embodiment detailed in Fig. 3, it will be seen that the bushing is formed upon its exposed end with a cylindrical lip 22 prolonged beyond the bearing surface proper and thus producing an annular channel surrounding the root end of the stub axle. Spaced radially outwardly from this lip and, with the latter, disposed concentric to the journal axis is a second and correspondingly projected cylindrical lip 23 prolonged from the hub of the cheek-plate to describe an outer annular channel. Of these two annular throats, the outer is quite wide by comparison with the inner throat.

The projection of the two cylindrical lips is such as will bring the same into spaced proximity of a ring 24 which is welded to the sheave to occupy a position overlying the face of the hub, and produced integral with this ring is a cylindrical neck 25 which is placed concentric to the axle and which registers with and extends into the outer of the two annular throats. The association of neck 25, the radially spaced cylindrical lips 22—23, and the root end of the stub axle produce the complements of a labyrinth seal, the neck and the axle being perforce rotative in nature while the two lips are each stationary. In holding the bushing stationary I provide the bushing with a pair of diametrically-opposite prong-like horns 32 which extend from the end opposite to the lip and find engagement in mating recesses (see Fig. 5) produced in the end wall of the journal opening.

Grease for the lubrication of the journal is supplied through fittings 28 exposed for servicing from the exposed face of a respective said cheek-plate, and is fed into an annular chamber external to the bushing wherefrom the same passes about the end face of the latter into an annular grease channel 26 formed in the inner wall of the bushing. Such internal channel laps the tail end of the stub-axle and gives connection both to lubricating grooves 27 cut spirally in the bearing surface of the axle and to face-channels 30 and 31 cut diametrically in the opposite sides of the thrust-washer, said spiral-cut grooves giving communication to the inner or ingress end of the labyrinth passage.

It will be self-evident that the principle of a labyrinth seal engineered into the greasing system and as applied to a pulley block of the journal-bearing type can be accomplished in several ways and, as an example of a modified structure, I have illustrated in Fig. 8 an assembly in which the paralleling channel-ways which produce the involved passages of a labyrinth are placed somewhat differently but accomplish the same end. In this modified assembly, the functional counterpart of the ring-and-neck member 24—25 constitutes a sleeve, as 33, which is press-fitted over the root end of the stub axle. On this sleeve is a circumferential flange 34, and the flange registers with and extends into a reentrant throat described by a bushing member 35. The bushing is made in two parts which becomes necessary due to the overlap as between the perimeter of the flange and the annular rib which produces the outer wall of the flange-receiving throat. In this modified view, the sheave, its axle, and the cheek-plate are denoted by 5', 18', and 7', respectively.

Numerous departures from the illustrated and described embodiments will suggest themselves having knowledge of my teachings, and it is self-evident that recourse may be freely had thereto without sacrifice of the inventive concept. It is my intention that all forms of construction and variation in detail coming within the scope of the hereto annexed claims are to be considered as comprehended by the invention.

What I claim, is:

1. In a pulley block, and in combination with a sheave presenting stub-axles extending from each side of the hub, and with a shell comprised of separated boltably interconnected cheek-plates providing coaxial journal bearings receiving the stub-axles of the sheave therein, interfitting means carried by the sheave and by the cheek-plates producing, at each side of the sheave's hub, a labyrinth type of friction-free closure leading by its involved passages from the journaled surface of the related axle to the atmosphere, and means for supplying grease to effect a lubrication of the bearings and cause the grease to fill said passages of the labyrinth closures, said grease being charged to the bearings at the end thereof remote from the labyrinth closures, and the bearing surfaces of said axles being spirally grooved to distribute the grease and carry the same to the labyrinth closures.

2. In a pulley block, and in combination with a shell comprised of separated boltably interconnected cheek-plates formed to present axially aligned openings arranged and adapted to serve as journal bearings and let in from the inner sides and closed to the outer sides of the plates, and with a sheave presenting stub-axles extending from each side of the hub and rotatively received in said openings, interfitting means carried by the sheave and by the cheek-plates producing, at each side of the sheave's hub, a labyrinth type of friction-free seal leading by its involved passages from the bearing for the related stub-axle to the atmosphere and functioning as a closure for the inner end of said bearing, fittings for a grease gun applied to each cheek-plate and exposed for servicing from the outer faces of the shell, and means for carrying charged grease along the length of the bearings to lubricate the latter and cause the grease to fill said passages of the labyrinth seals.

3. The combination, in a pulley block, of a sheave, a shaft fast to the hub of the sheave and presenting oppositely extending stub-axles spirally grooved along the bearing surfaces to provide grease-carrying canals, a shell comprised of companion cheek-plates boltably interconnected to lie at opposite sides of the sheave and each having an opening let in from the inner face to accommodate a related said axle, said openings being closed to the outer face of the related cheek-plate, a bushing lining each opening and producing a journal bearing for the related axle, a thrust-washer for each axle seating against the closed end wall of the opening, said assembled sheave and shell describing an annular throat at each side of the sheave's hub open to the interior of the block and giving communication with the inner ends of the grease canals, annular tongues placed concentric to the axle and carried for unitary movement with the sheave at each end of the latter's hub to project into a respective said throat, stationary annular tongues directed opposite to said first-named tongues and carried by each cheek-plate to interfit with the first-named tongues and produce a labyrinth type of friction-free seal closing the open throats, and means for charging grease to the block arranged and adapted to be serviced exteriorly of the shell and functioning to supply grease to the outer ends of the stub-axles and along the grease canals into the involved passages of the labyrinth closures.

4. Structure according to claim 3 wherein, for holding the bushing against rotation, the bushing is formed upon the end opposite to the labyrinth closure with coupling-horns extending as terminal prongs and arranged to engage in mating recesses formed in said closed end wall of the journal opening.

PETER ANDERSON.

REFERENCES CITED

The following references are of record in the file of this patent:

UNITED STATES PATENTS

| Number | Name | Date |
| --- | --- | --- |
| 876,176 | Hammond | Jan. 7, 1908 |
| 1,032,593 | Fairbanks | July 16, 1912 |
| 1,780,804 | Ward | Nov. 4, 1930 |
| 2,272,826 | Bardsley | Feb. 10, 1942 |